USOO5626322A

United States Patent [19]
Braun

[11] Patent Number: 5,626,322
[45] Date of Patent: May 6, 1997

[54] PORTABLE INSTRUMENT SUPPORT AND POSITIONING SYSTEM

[75] Inventor: David G. Braun, St. Joseph, Minn.

[73] Assignee: Tree-Pod, Inc., St. Cloud, Minn.

[21] Appl. No.: 348,794

[22] Filed: Dec. 2, 1994

[51] Int. Cl.$^6$ ............................................. E04G 3/00
[52] U.S. Cl. .................................. 248/282.1; 248/283.1; 248/274.1
[58] Field of Search ........................ 248/282.1, 283.1, 248/274.1, 230.8; 182/92

[56] References Cited

U.S. PATENT DOCUMENTS

| | | |
|---|---|---|
| 4,735,389 | 4/1988 | Graham . |
| 4,913,391 | 4/1990 | Klipp . |
| 5,128,548 | 7/1992 | Goodson et al. . |
| 5,246,193 | 9/1993 | Faidley . |

OTHER PUBLICATIONS

Velbon Int'l Corp., Tripods and Accessories Catalog, pp. 1–2, published prior to Dec. 2, 1994.
ANCRA Int'l, Catalog No. 206A, pp. 1–2, 34, and 39, published prior to Dec. 2, 1994.
Velbon Int'l Corp., Video and Tripods Catalog, 1993, pp. 1–6, published prior to Dec. 2, 1994.

*Primary Examiner*—Ramon O. Ramirez
*Assistant Examiner*—Willie Berry, Jr.
*Attorney, Agent, or Firm*—Merchant, Gould, Smith, Edell, Welter & Schmidt, P.A.

[57] ABSTRACT

A support and positioning system having: a platform for supporting a portable instrument, at least one member that connects the platform to a mounting device, and a mounting device that connects the system to a stable structure. In a preferred embodiment, the platform for supporting a portable instrument is included in a panhead, and the mounting device has two ends. One of these ends, in a preferred embodiment, is threaded for easy insertion into a stable structure, such as a tree or pole. In another preferred embodiment, the mounting device includes a belt and buckle that can be wrapped around and secured to the stable structure.

24 Claims, 5 Drawing Sheets

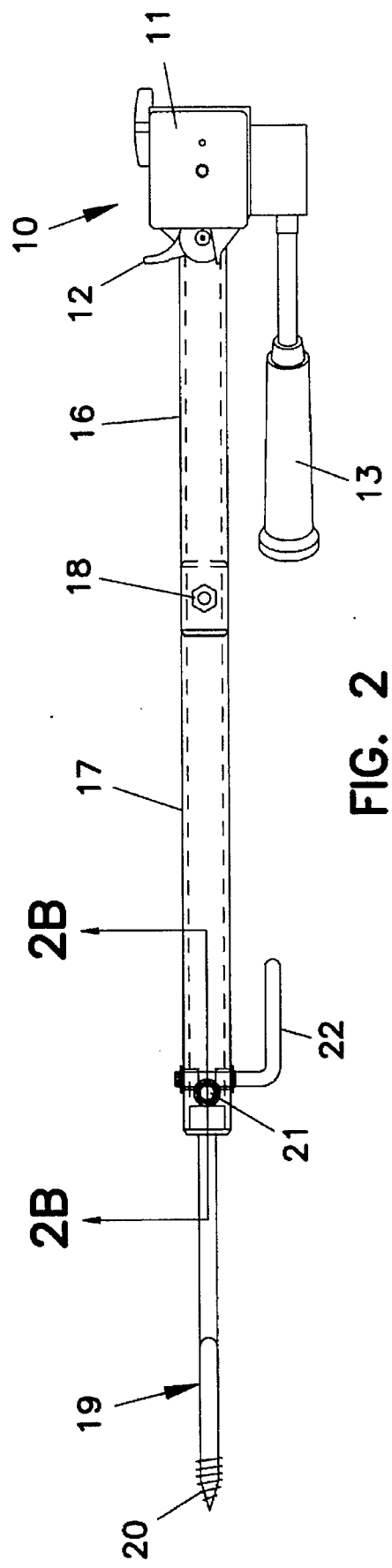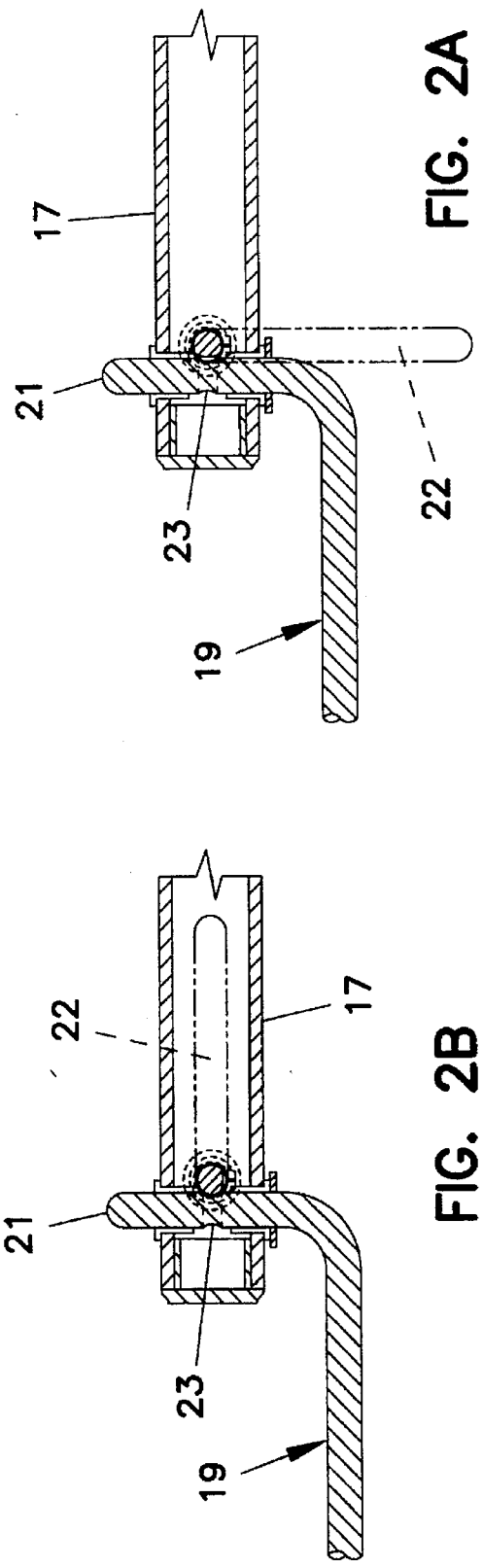

PORTABLE INSTRUMENT SUPPORT AND POSITIONING SYSTEM

FIELD OF THE INVENTION

This invention relates to a portable instrument support and positioning system. In particular, the invention relates to a portable system for supporting and positioning portable instruments.

BACKGROUND OF THE INVENTION

There are a variety of portable means for supporting and positioning portable instruments. For example, U.S. Pat. No. 5,246,193 issued to Warren Faidley on Sep. 21, 1993, discloses a mobile camera mounting device having two suction cups that secure the mounting device to a windshield of a vehicle. U.S. Pat. No. 5,128,58 issued to William Goodson on Jul. 7, 1992 discloses a microprocessor based device used for monitoring a location. This device is mounted to a tree using a belt and buckle means that is attached to the monitoring device. U.S. Pat. No. 4,913,391 issued to Kenneth Klipp on Apr. 3, 1990 discloses a gun rest and sports equipment holder having a portable bracket with attaching clamp, a cradle for a gun rest and an optional adaptor, which is adjustable for various viewing heights, for holding spotting telescopes and cameras. U.S. Pat. No. 4,735,389 issued to Philip Graham on Apr. 5, 1988 discloses a modular support system, which includes at least two elongated bars, each having a longitudinally extending slot traversing substantially the entire length thereof except at the ends thereof. A clamping member is also provided for engagement with the elongated bar and for use when at least two elongated bars are used. This modular support system can be used to support cameras and other portable instruments, because it is useable in the legs of a tripod.

Tripods have traditionally been used to support and position portable instruments, such as cameras, videocameras, and telescopes. In conventional tripods, a base plate is provided to which the portable instrument is attached, and two or three metallic pipes or tubes with small diameters are arranged telescopically within one another to permit adjustment to the height of the tripod. However, tripods can be difficult to manipulate in many types of areas. A conventional tripod requires a particular amount of relatively level ground space for assembly, adjustment, and set up. In some areas, such as hilly wooded areas, this type of ground space may not be available.

It is also beneficial if a portable instrument support and positioning system is light weight, easy to transport, and easy to assemble prior to use. If the portable instrument support and positioning system is relatively easy to assemble, then set up time can be minimized and efficient use of the support and positioning system can be maximized.

SUMMARY OF THE INVENTION

The invention is directed toward a portable system for supporting and positioning portable instruments, such as cameras, videocameras, and telescopes. In general, the system includes at least three parts: (1) a means having a platform for supporting a portable instrument; (2) at least one member for connecting the means for supporting a portable instrument to a mounting means; (3) and a mounting means suitable for mounting a member, which has a means for supporting a portable instrument and a portable instrument attached thereto, to a stable structure, such as a tree or pole.

A portable instrument support system of the invention includes: (a) a mounting member having a first end and a second end and (b) a mounting device having a portion for attaching the support system to a post or the like, a center portion, and an opposite end portion constructed and arranged to extend vertically upward when said mounting device is attached and in use. Preferably, the portion for attaching the support system to a post or the like, the center portion, and the end portion are included in a single unit for ease in transporting and using the portable device of the invention. By "single unit" it is meant that these sections of the mounting device are unitary portions of a single, one-piece device. A means having a platform for supporting a portable instrument, such as a panhead or a base plate having a screw thereon, is mounted to the first end of the mounting member, and the second end of the mounting member has an opening therein. The opposite end portion of the mounting device extends through said opening to support said mounting member for pivotal movements in a generally horizontal plane. The mounting member can be an articulated member, which is capable of two-dimensional or three dimensional movement.

The portion for attaching the support system can include a belt and buckle means, or alternatively, the portion for attaching the support system can have a threaded end. The means for supporting a portable instrument, such as a panhead or a base plate having a screw thereon, can be capable of three-dimensional movement.

If the portion for attaching the support system has a threaded end, then the center portion can be a crank-arm portion. Regardless of which type of portion for attaching the support system that the portable instrument support system has, the opposite end portion can have a stop member attached thereto to support said mounting member thereon. In addition, said opposite end portion can have a locking groove therein located above said stop member. Further, the mounting member can have a second opening therein perpendicular to said first opening and a locking pin extending through said second opening to engage said groove to lock said mounting member to said end portion. The mounting member can be an articulated member.

A preferred portable instrument support system of the invention includes: (a) a first mounting member having a first end and a second end, and a means having a platform for supporting a portable instrument mounted to said first end; (b) a mounting device having a portion for attaching the support system to a post or the like, a center portion, and an opposite end portion constructed and arranged to extend vertically upward when said mounting device is attached and in use; and (c) a second mounting member having a first end with an opening therein, said opposite end portion of said mounting device extending through said opening to support said second mounting member for pivotal movements in a generally horizontal plane, and a second end pivotally attached to said second end of said first mounting member to permit pivotal movements thereof in a generally horizontal plane.

The mounting device attaching portion can include a slotted support plate connected to said center portion for placement against the post or the like, a belt extending through said slots, and a buckle for attaching the belt to the post or the like. The attaching portion can include a metal plate with slots, a belt extending through said slots, and means for securing said belt around said post or the like with the metal plate disposed against the post. The metal plate can have a pair of spread wings extending rearwardly therefrom to attach partly around the pole or the like to stabilize said mounting device.

In a preferred portable instrument support system the portion for attaching the support system has a threaded end, and the means having a platform for supporting a portable instrument is capable of three-dimensional movement.

BRIEF DESCRIPTION OF THE DRAWINGS

In the drawings, wherein like reference letters and numerals indicate corresponding elements throughout the several views:

FIG. 2 hows a top view of a portable instrument support and positioning system of the invention;

FIG. 2a shows a cross section analogous to one taken along 2b–2b of FIG. 2 wherein the mechanism for securing the mounting means is in an unlocked position;

FIG. 2b hows a cross section taken along 2b–2b of FIG. 2 wherein the mechanism for securing the mounting means is in a locked position;

DETAILED DESCRIPTION OF THE PREFERRED EMBODIMENTS

The invention is directed toward a portable system for supporting and positioning portable instruments, such as cameras, videocameras, and telescopes. In general, the system includes at least three parts: (1) a means having a platform for supporting a portable instrument; (2) at least one member for connecting the means for supporting a portable instrument to a mounting means; (3) and a mounting means suitable for mounting a member, which has a means for supporting a portable instrument and a portable instrument attached thereto, to a stable structure, such as a tree, stake or pole.

Figure 1:
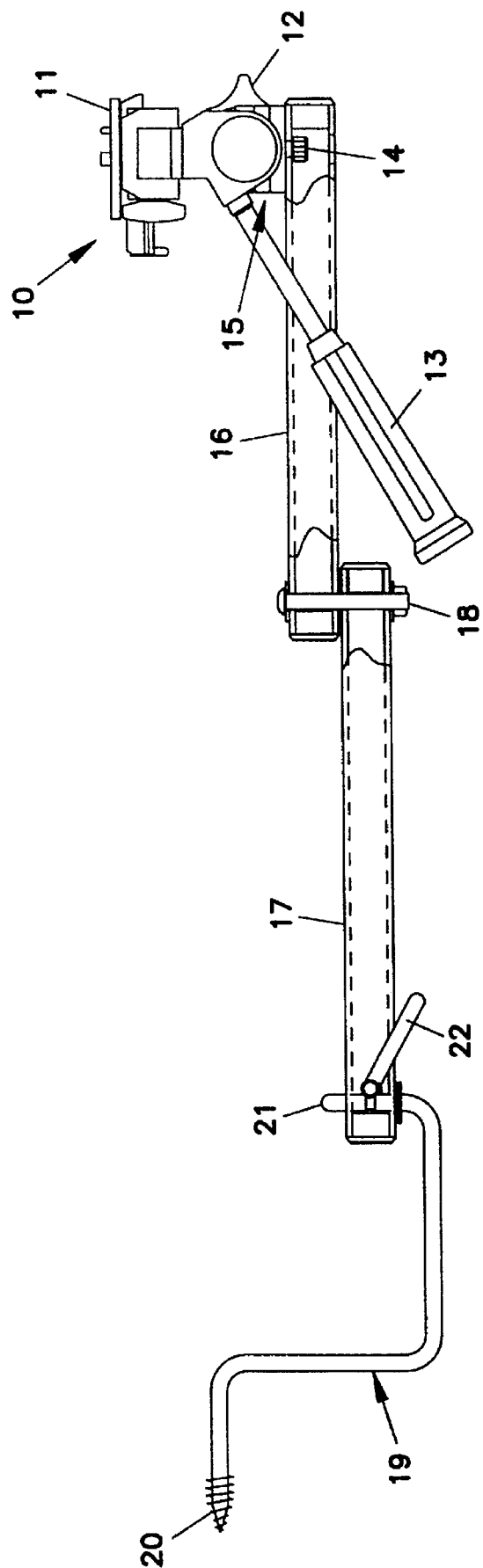
FIG. 1 shows a front view of a portable instrument support ad positioning system of the invention.

Referring to FIG. 1, which is a preferred instrument support and positioning system in accord with the invention, the system has a mounting means 19, a first member 16, a second member 17 and a means having a platform for supporting a portable instrument. In the Figures the means having a platform for supporting a portable instrument is a panhead 10. However, any means having a base plate or platform that will support a portable instrument is sufficient. For example, a base plate or platform with a screw thereon is sufficient. Preferably, the means for supporting a portable instrument is capable of providing a portable instrument with two-dimensional or three-dimensional movement as a panhead typically is. The panhead 10 has a base plate 11 for mounting one of a variety of portable instruments, such as cameras, videocameras, telescopes or other viewing and/or surveying equipment. In addition, panhead 10 has the capability for providing a mounted instrument, such as the telescope 52 in FIG. 5, with three-dimensional movement. The set of circular disks 15 support the base plate 11 and any instruments attached thereto and provide the base plate 11 with 360 degree rotational movement.

Handle 13 is used to position the base plate 11 and thus any instrument mounted thereon. Handle 13 can be moved in a vertical and in a horizontal direction in order to provide base plate 11 and any mounted instrument with greater movement capability. Adjustment knob 12, when tightened, locks the position of base plate 11, and thus any instrument mounted thereon, in place. Generally, any commercially available panhead is usable in the invention. Preferably, the panhead that is used provides the mounted instrument with a wide variety of movement capability, and the capability for mounting a variety of portable instruments. Panheads usable in the invention include those commercially available from Velbon International Corp. in Torrance, Calif.

Panhead 10 is attached to a first end of a first member 16. The attachment means, such as a screw and bolt 14, for attaching a means having a platform for supporting a portable instrument, such as panhead 10, to a first end of a first member should be capable of safely securing the means for supporting a portable instrument and any portable instrument mounted thereon. In order to facilitate a particular attachment means, a hole may have to be put in the first end of first member 16.

First member 16 should be made of a material that can support the weight of panhead 10, the weight of the attachment means, and the weight of any instrument mounted onto base plate 11. Usable materials include a variety of metals and hard plastics. Preferably, first member 16 can safely support at least 10 lbs.

At the opposite end of first member 16 from panhead 10, or at the second end of the first member, is a connecting means 18. A connecting means, in a preferred embodiment, is used to connect first member 16 with a second member 17. The connecting means, such as a bolt 18, should allow first member 16 to fully rotate 360 degrees with respect to second member 17. In other words, first member 16 should be capable of being rotated without disrupting the connecting means, such as a bolt 18, to a position in which it is juxtaposed above or below second member 17. This capability provides any mounted instrument with a wide variety of movement. It may be necessary, as in the case of a bolt 18, to put a hole in the second end of first member 16 in order to provide an appropriate means for connecting first member 16 to second member 17.

Second member 17 is substantially analogous to first member 16. The first end of the second member 17 is attached to the second end of first member 16, and the second end of second member 17 is attached to a means for mounting the support system and any mounted instrument to a stable structure, such as a pole or tree. First member 16 may have to be a little shorter in length than second member 17 in order to accommodate the requirement that first member 16 be capable of rotating 360 degrees with respect to second member 17. In other words, if first member 16 and second member 17 are the exact same length, then first member 16 may be inhibited from being rotated 360 degrees by first end 21 of mounting means 19.

Mounting means 19, in a preferred embodiment, has a first end 21 and a second end 20. As depicted in FIG. 1 there is a hole in the second end of second member 17 wherein a first end 21 of preferred mounting means 19 is inserted. Locking mechanism 22, when engaged, secures first end 21 of mounting means 19.

FIG. 2 represents a top view of a support and positioning system in accord with the invention. FIGS. 2a and 2b show a cross section of locking mechanism 22 as taken along 2b–2b in FIG. 2. FIG. 2b shows locking mechanism 22 engaged and FIG. 2a shows locking mechanism 22 not engaged. Insert or locking groove 23 in first end 21 acts as a bearing for first end 21. First end 21 can also have a stop member below locking groove 23 in order to support a member thereon.

Mounting means 19 can be any means of mounting second member 17 to a stable structure, such as a tree or pole. Mounting means 19 should be capable of safely supporting the weight of second member 17, first member 16, panhead 10 and any instrument mounted on base plate 11. In FIG. 1, mounting means 19 has a first end 21 and a second end 20, which is pointed and threaded in anticipation of mounting the support system to a stable wooden structure.

Figure 3:
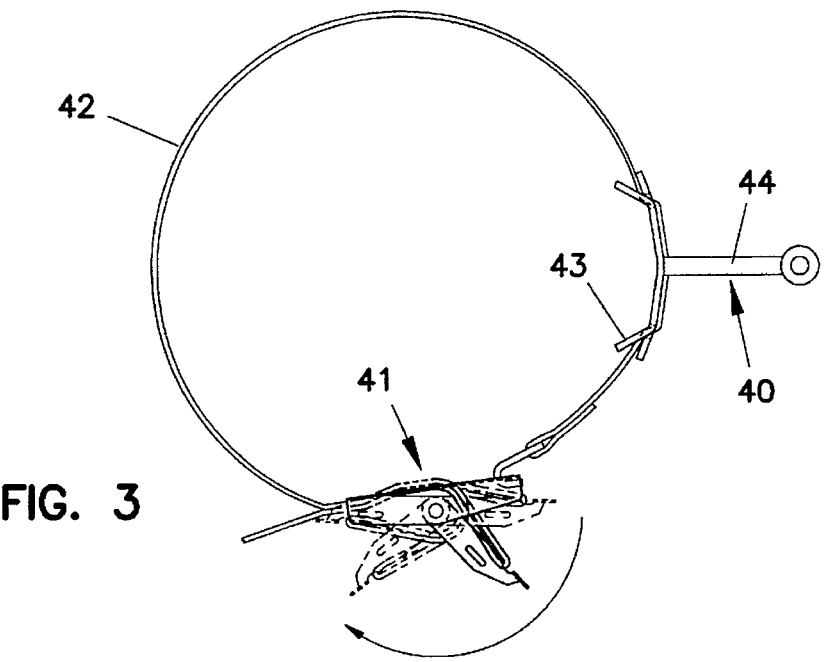
FIG. 3 shows a top view of a mounting means which includes a belt and buckle means and a connecting means in accord with the invention.
Figure 3A:
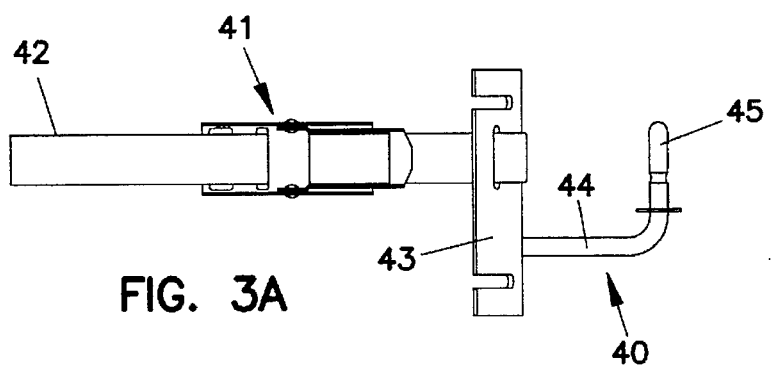
FIG. 3a shows a front view of a mounting means which includes a belt and buckle means and a connecting means in accord with the invention.
Figure 3B:
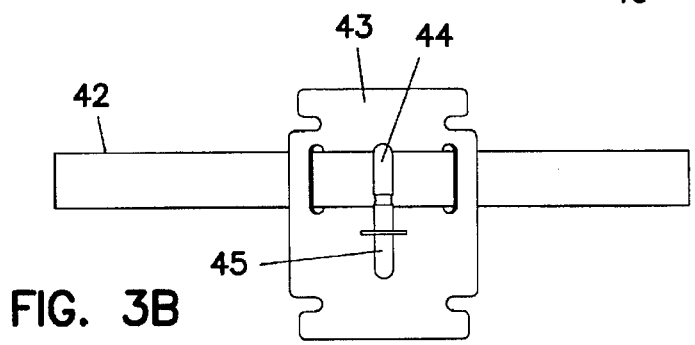
FIG. 3b shows a side view of a mounting means which includes a belt and buckle means and a connecting means in accord with the invention.
Figure 3C:
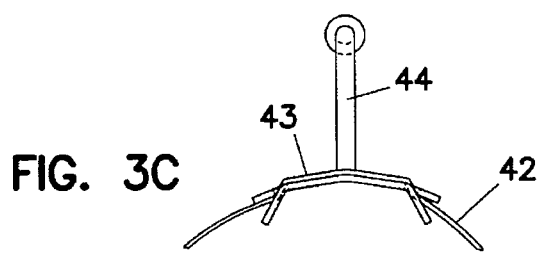
FIG. 3c shows a bottom view of a mounting means which includes a belt means and a connecting means in accord with the invention.

In an alternative embodiment, as depicted in FIGS. 3, 3a, 3b, 3c, and 5, mounting means 19 can include a belt and buckle means and a connecting means 40. The belt and buckle means includes a belt 42 and a buckle 41. Connecting means 40 includes a first end 45, a bar 44, and a connecting plate 43. First end 45 is inserted into a hole in the second end of second member 17 and is secured by engaging locking means 22. Bar 44 connects first end 45 with connecting plate 43. Connecting plate 43 connects Bar 44 with belt 42. FIGS. 3, 3a, 3b, and 3c are top, front, side and bottom drawings of the belt and buckle means and connecting means 40. The movement of buckle 41 is illustrated in FIG. 3.

Figure 5:
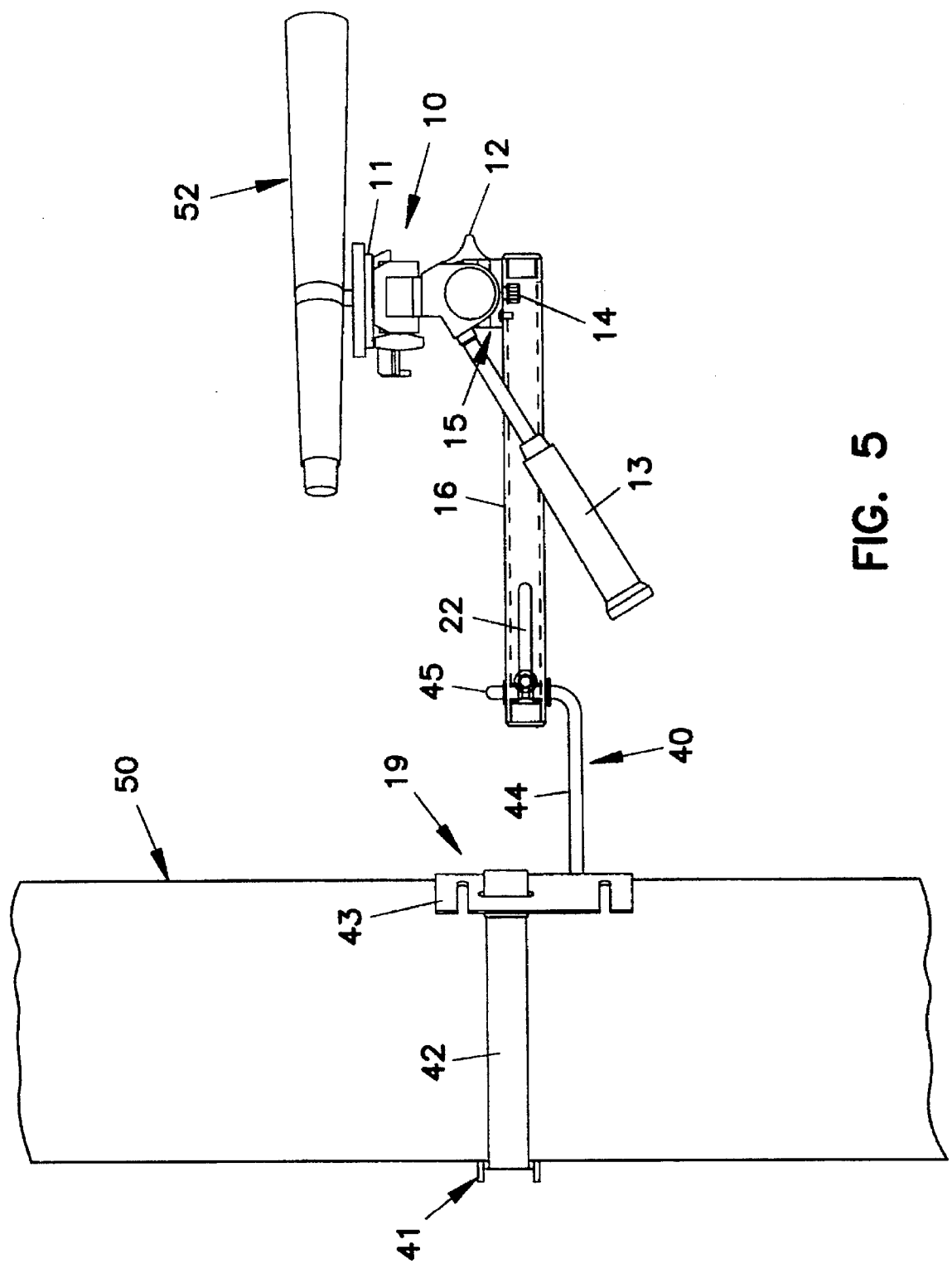
FIG. 5 shows a front view of a portable instrument support, and positioning system of the invention mounted to a tree and having a telescope thereon.

FIG. 5 represents an alternative embodiment of a support and positioning system of the invention. Mounted on base plate 11 is a telescope 52. Panhead 10 is connected to a first end of a first member 16 via connecting means 14. Movement of panhead 10 is facilitated by handle 13. At the opposing end of first member 16 is a hole into which first end 45 of connecting means 40 is inserted. Locking means or mechanism 22, when engaged, secures first end 45. Bar 44 is connected to first end 45 and connecting plate 43, which connects bar 44 to belt 42. Buckle 41 secures belt 42 to a stable structure 50, such as a tree or pole. FIG. 5 discloses an embodiment in which there is only one member connecting panhead 10 with mounting means 19.

Figure 4:
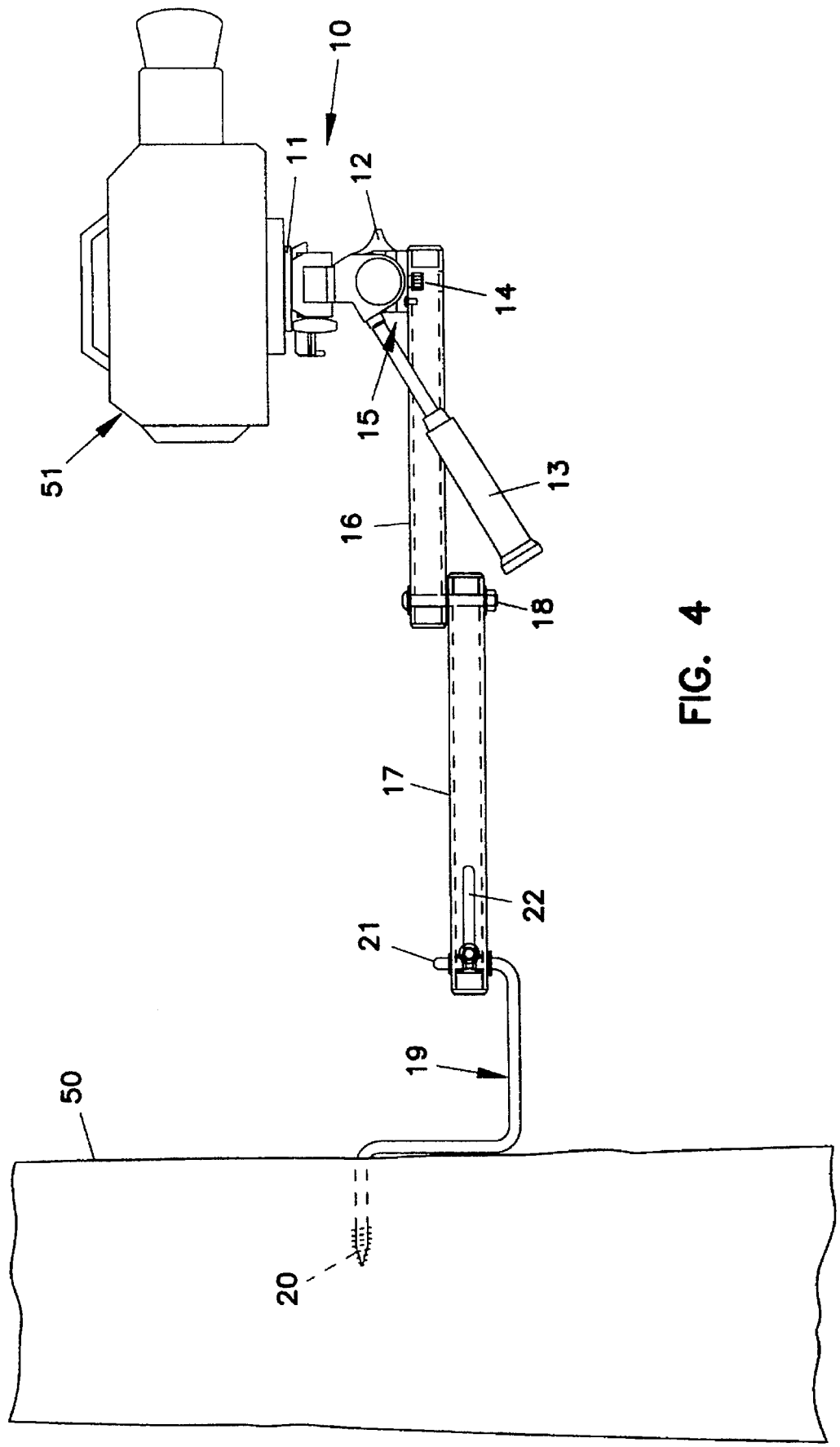
FIG. 4 shows a front view of a portable instrument support and positioning system of the invention with a videocamera thereon and mounted to a tree.

FIG. 4 represents a support and positioning system of the invention having a videocamera 51 mounted to base plate 11.

The support and positioning system of the invention should be made of materials that are strong but relatively lightweight for ease in transporting and storing the system. In addition, assembly and disassembly of the system should be relatively easy. For example, all embodiments of mounting means 19 should be easily removed and exchanged. The size of the system and each of its components varies with the types of areas in which it is likely to be used and with the type of portable instrument to be mounted to the platform of the means for supporting a portable instrument.

It is to be understood that although numerous characteristics and advantages of the present invention have been set forth in the foregoing description, together with details of structure and function of the invention, the disclosure is illustrative only. Changes may be made in detail, especially in matters of shape, size and attachment means within the principles of the invention to the full extent indicated by the broad general meaning of the terms in which the following claims are expressed.

What is claimed is:

1. A portable instrument support system comprising:
   (a) a mounting member having a first end and a second end, wherein a means having a platform for supporting a portable instrument is mounted to said first end, the second end having an opening therein; and
   (b) a mounting device having a threaded end portion for attaching the support system to a post or a tree, a center portion, and an opposite end portion constructed and arranged to extend vertically upward when said mounting device is attached and in use;
   wherein the opposite end portion of said mounting device extends through said opening to support said mouting member for pivotal movements in a generally horizontal plane and wherein the threaded end portion for attaching the support system to a post or a tree, the center portion, and the end portion are included in a single, one-piece unit.

2. The portable instrument support system of claim 1, wherein the mounting member is an articulated member.

3. The portable instrument support system of claim 2, wherein the articulated member is capable of two-dimensional movement or three dimensional movement.

4. The portable instrument support system of claim 1 wherein the means having a platform for supporting a portable instrument is a panhead, said panhead being capable of three-dimensional movement.

5. The portable instrument support system of claim 1, wherein the center portion is a crank-arm portion.

6. The portable instrument support system of claim 1, wherein the opposite end portion has a stop member attached thereto to support said mounting member thereon.

7. The portable instrument support system of claim 1 wherein said opposite end portion has a locking groove therein located above said stop member, said mounting member having a second opening therein perpendicular to said first opening and a locking pin extending through said second opening to engage said groove to lock said mounting member to said end portion.

8. A portable instrument support system comprising:
   (a) a first mounting member having a first end and a second end, and a means having a platform for supporting a portable instrument mounted to said first end;
   (b) a mounting device having a threaded end portion for attaching the support system to a post or a tree, a center portion, and an opposite end portion constructed and arranged to extend vertically upward when said mounting device is attached and in use; and
   (c) a second mounting member having a first end with an opening therein, said opposite end portion of said mounting device extending through said opening to support said second mounting member for pivotal movements in a generally horizontal plane, and a second end pivotally attached to said second end of said first mounting member to permit pivotal movements thereof in a generally horizontal plane, wherein the threaded end portion for attaching the support system, the center portion and the opposite end portion are a single unit.

9. The portable instrument support system of claim 8, wherein the means having a platform for supporting a portable instrument is a panhead, said panhead being capable of three-dimensional movement.

10. A portable instrument support system comprising:
   (a) a first member having a first end and a second end, and a panhead mounted to said first end;

(b) a mounting device being adapted to be screwed into a post or a tree having an end portion with a threaded end for attaching the support system to a post or the like, a center portion, and an opposite end portion constructed and arranged to extend vertically upward when said mounting device is attached and in use, wherein the threaded end, the center portion and the opposite end portion are a single unit; and (c) a second member having a first end with an opening therein, said opposite end portion of said mounting device extending through said opening to support said second member for pivotal movements in a generally horizontal plane, and a second end pivotally attached to said second end of said first member to permit pivotal movements thereof in a generally horizontal plane.

11. The portable instrument support system of claim 10, wherein said center portion is a crank-arm portion.

12. The portable instrument support system of claim 10, wherein the panhead is capable of three-dimensional movement.

13. A portable instrument support system comprising:

(a) a first member having a first end and a second end, wherein a panhead is mounted to said first end, and the second end having a first opening therein; and (b) a mounting device being adapted to be screwed into a post or a tree having an end portion with a threaded end for attaching the support system to a post or the like, a center portion, and an opposite end portion constructed and arranged to extend vertically upward when said mounting device is attached and in use, wherein the threaded end, the center portion, and the opposite end portion are a single unit; and wherein the opposite end portion of said mounting device extends through said first opening to support said first member for pivotal movements in a generally horizontal plane.

14. A portable instrument support system of claim 13, wherein said opposite end portion has a stop member attached thereto to support said first member thereon.

15. A portable instrument support system of claim 14, wherein said opposite end portion has a locking groove therein located above said stop member, said first member having a second opening therein perpendicular to said first opening, and a locking pin extending through said second opening to engage said groove to lock said first member to said end portion.

16. A portable instrument support system comprising:

(a) a mounting member having a first end and a second end, wherein a means having a platform for supporting a portable instrument is mounted to said first end and the second end has an opening therein; and (b) a mounting device having a portion for attaching the support system to a post or a tree, a center portion and an opposite end portion constructed and arranged to extend vertically upward when said mounting device is attached and in use;

wherein the opposite end portion of said mounting device extends through said opening to support said mounting member for pivoting movements in a generally horizontal plane; wherein the opposite end portion has a stop member attached thereto to support said mounting member thereon; and wherein said opposite end portion has a locking groove therein located above said stop member, said mounting member having a second opening therein perpendicular to said first opening and a locking pin extending through said second opening to engage said groove to lock said mounting member to said end portion.

17. A portable instrument support system comprising:

(a) a first member having a first end and a second end, wherein a panhead is mounted to said first end, and the second end has a first opening therein; and (b) a mounting device having an end portion with a threaded end for attaching the support system to a tree or a tree, a center portion, and an opposite end portion constructed and arranged to extend vertically upward when said mounting device is attached and in use; wherein the opposite end portion of said mounting device extends through said first opening to support said first member for pivotal movements in a generally horizontal plane; wherein said opposite end portion has a stop member attached thereto to support said first member thereon; wherein said opposite end portion has a locking groove therein located above said stop member, said first member, having a second opening therein perpendicular to said first opening, and a locking pin extending through said second opening to engage said groove to lock set first member to said end portion.

18. A portable instrument support system comprising:

(a) a mounting member having a first end and a second end, wherein a means having a platform for supporting a portable instrument is mounted to said first end, the second end having an opening therein; and (b) a mounting device having a belt and buckle means for attaching the support system to a post or a tree, a center portion, and an opposite end portion constructed and arranged to extend vertically upward when said mounting device is attached and in use; wherein the opposite end portion of said mounting device extends through said opening to support said mounting member for pivotal movements in a generally horizontal plane and wherein the center portion and the opposite end portion are included in a single, one-piece unit; wherein the opposite end portion has a stop member pivotally attached thereto to support said mounting member thereon.

19. The portable instrument support system of claim 18, wherein the mounting member is an articulated member.

20. The portable instrument support system of claim 18, wherein the articulated member is capable of two-dimensional movement or three-dimensional movement.

21. A portable instrument support system comprising:

(a) a first mounting member having a first end and a second end, and a means having a platform for supporting a portable instrument mounted to said first end;

(b) a mounting device having a belt and buckle means for attaching the support system to a post or a tree, a center portion, and an opposite end portion constructed and arranged to extend vertically upward when said mounting device is attached and in use; and (c) a second mounting member having a first end with an opening therein, said opposite end portion of said mounting device extending through said opening to support said second mounting member for pivotal movements in a generally horizontal plane, and a second end pivotally attached to said second end of said first mounting member to permit pivotal movements thereof in a generally horizontal plane.

22. The portable instrument support system of claim 21, wherein the mounting device having a belt and buckle means includes a slotted support plate connected to said center portion for placement against the post, a belt extending through said slots, and a buckle for attaching the belt to the post.

23. The portable instrument support system of claim 21, wherein the belt and buckle means includes a metal plate with slots, a belt extending through said slots, and means for securing said belt around said post with the metal plate disposed against the post or tree.

24. The portable instrument support system of claim 23, wherein said metal plate has a pair of spread wings extending rearwardly therefrom to attach partly around the pole or tree to stabilize said mounting device.

* * * * *

UNITED STATES PATENT AND TRADEMARK OFFICE
CERTIFICATE OF CORRECTION

PATENT NO. : 5,626,322

DATED : May 6, 1997

INVENTOR(S) : David G. Braun

It is certified that error appears in the above-identified patent and that said Letters Patent is hereby corrected as shown below:

Col. 1, line 17, "5,128,58" should read --5,128,548--

Col. 3, line 11: "ad" should read --and--

Col. 5, line 30: "Bar" should read --bar--

Col. 6, line 14, claim 1: "mouting" should read --mounting--

Col. 8, line 6, claim 17: "tree" should read --post--

Signed and Sealed this

Thirtieth Day of December, 1997

Attest:

BRUCE LEHMAN

Attesting Officer

Commissioner of Patents and Trademarks